(No Model.)
E. CYRUS.
MILLSTONE DRESS.
No. 259,103. Patented June 6, 1882.
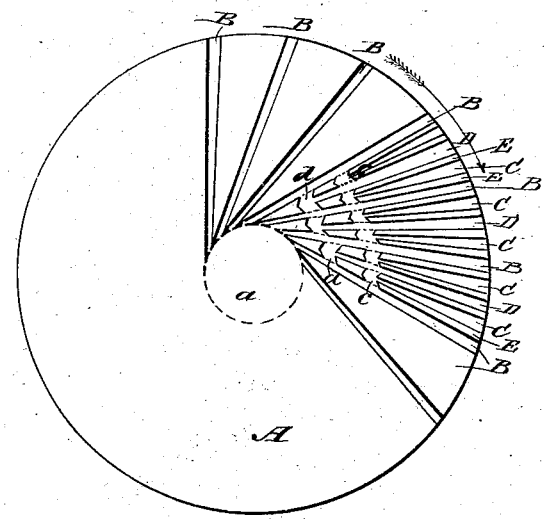
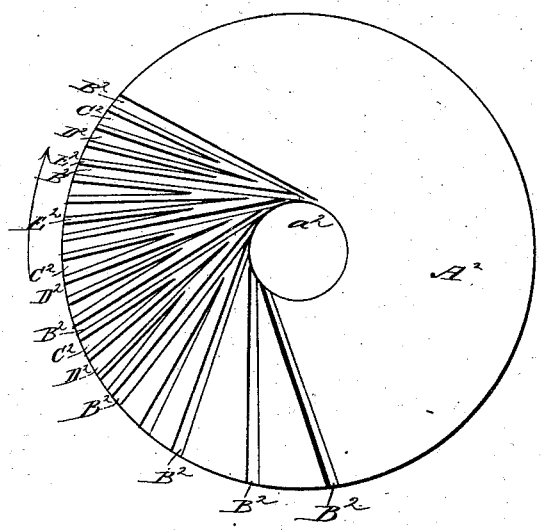
WITNESSES:
INVENTOR:
E. Cyrus
BY
ATTORNEYS.

UNITED STATES PATENT OFFICE.

EDINBORO CYRUS, OF AUGUSTA, OHIO, ASSIGNOR TO HIMSELF AND ALEXANDER CUNNINGHAM, OF SAME PLACE.

MILLSTONE-DRESS.

SPECIFICATION forming part of Letters Patent No. 259,103, dated June 6, 1882.

Application filed March 1, 1882. (No model.)

*To all whom it may concern:*

Be it known that I, EDINBORO CYRUS, of Augusta, Carroll county, Ohio, have invented a new and useful Improvement in Millstone-Dress, of which the following is a full, clear, and exact description.

My invention relates to a dress which is more particularly intended for making middlings previous to regrinding.

The invention consists essentially in a bed-stone provided with intermediate furrows between the quarter-furrows and transverse channels connecting said furrows, in combination with a runner provided with intermediate furrows between the quarter-furrows, and having the lands of each quarter connected with each other, as hereinafter more particularly described.

Reference is to be had to the accompanying drawings, forming part of this specification, in which similar letters of reference indicate corresponding parts in both figures.

Figure 1 is a view of a bed-stone, and Fig. 2 is a view of a runner provided with my improved dress.

Referring first to Fig. 1, A represents the bed-stone. B are the quarter-furrows, which are tangential to the eye $a$. The space between two of the furrows B is called a "quarter." In each quarter, midway between the quarter-furrows, is a furrow, D, which extends from the periphery to a point about three-fourths of the distance from said periphery to the center of the stone. At the inner end of this furrow is an arrow-head-shaped transverse channel, $d$, which connects said furrow D with its two quarter-furrows, B. On each side of the furrow D, midway between it and the nearest quarter-furrow, is a furrow, C, which extends from the periphery to a point about half the distance to the center. At the inner end of this furrow is an arrow-head-shaped channel, $c$, which connects said furrow C with a quarter-furrow, B, on one side and the middle furrow, D, on the other side. By this arrangement of the channels $c$ and $d$ communication is established with all the furrows in the stone. The quarter-furrows B are slightly tapered outward, the middle furrows, D, more tapered than the quarter-furrows, and the furrows C still more tapered than the middle furrows; and the tapering form of each furrow is such that the land E between it and the next furrow is of uniform width throughout. The furrows are also made gradually more shallow toward the periphery of the stone, the decrease in depth being made as nearly as possible proportionate to the increase in width in order to produce in the furrow a uniform capacity throughout.

Referring now to Fig. 2, $A^2$ represents the runner. $B^2$ are the quarter-furrows, which are parallel with the quarter-furrows of the bed-stone when the two stones are face to face. In each quarter of the runner, midway between the quarter-furrows, is a tapering furrow, $D^2$, which terminates in a point extending nearly to the eye $a^2$. On each side of the furrow $D^2$, midway between it and the nearest quarter-furrow, is a tapering furrow, $C^2$, which terminates in a point about half-way between the periphery and the center of the stone. The tapering form of these furrows is such as to produce a uniform width of the lands $E^2$ between them. Instead of having the furrows connected as in the bed-stone, the runner has its lands $E^2$ communicating with each other. The furrows in this stone are also made gradually more shallow toward the periphery proportionately to the width, as before described.

My improved dress possesses several advantages over those heretofore known to me. By reducing the size or width of the lands and increasing the number of furrows and connecting them by transverse channels of the peculiar arrow-head form shown herein, the grain is distributed evenly and uniformly throughout and a greater quantity and better quality of middlings are produced with less flour, in consequence of which the stones do not require so much ventilating nor the middlings so much bolting and purifying as has heretofore been the case.

Having thus described my invention, I claim as new and desire to secure by Letters Patent—

1. A bed-stone dress consisting of the quarter-furrows B, tangential to the eye $a$, the furrows D, arranged midway between the quarter-furrows, extending three-fourths of the distance from the periphery to the center of stone, and connected by a transverse channel, $d$, with the quarter-furrows, and the furrows C, placed midway between the furrows B D, extending about one-half the distance from the periphery to center of the stone, and connected by channels $c$ with the furrows B D, the furrows B D C successively increasing in their taper toward the periphery, as described.

2. A runner-dress consisting of the quarter-furrows $B^2$, the tapering furrows $D^2$, arranged midway between the quarter-furrows, and terminating in a point extending nearly to the eye $a^2$, the tapering furrows $C^2$, arranged midway between the furrows $B^2 D^2$, and terminating in a point one-half the distance from the periphery to the eye $a^2$, and the equal lands $E^2$, communicating with each other, said furrows becoming gradually more shallow toward the periphery, as described.

3. The combination of a bed-stone provided with intermediate furrows and transverse channels between its quarter-furrows, and a runner provided with intermediate tapering furrows between its quarter-furrows, and having the lands of each quarter communicating with each other, substantially as herein described.

EDINBORO CYRUS.

Witnesses:
J. B. ROACH,
WM. ASHBROOK.